Figures 1, 2:
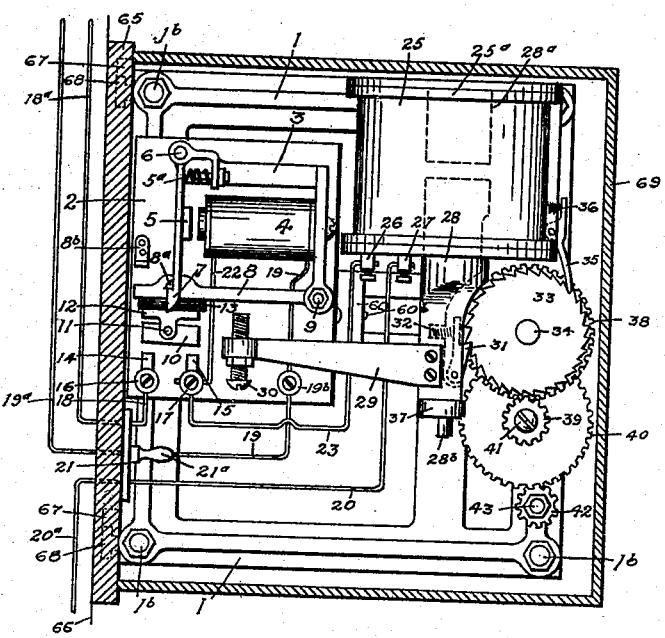

G. R. LIVERGOOD & B. C. DONNELLY.
STREET AND STATION ANNUNCIATOR AND ADVERTISER.
APPLICATION FILED MAY 26, 1908.

937,253.

Patented Oct. 19, 1909.

4 SHEETS—SHEET 1.

WITNESSES:

INVENTORS
Gerald R. Livergood
Bertram C. Donnelly
BY
George W. Hinton
ATTORNEY

G. R. LIVERGOOD & B. C. DONNELLY.
STREET AND STATION ANNUNCIATOR AND ADVERTISER.
APPLICATION FILED MAY 26, 1908.
937,253.
Patented Oct. 19, 1909.
4 SHEETS—SHEET 2.
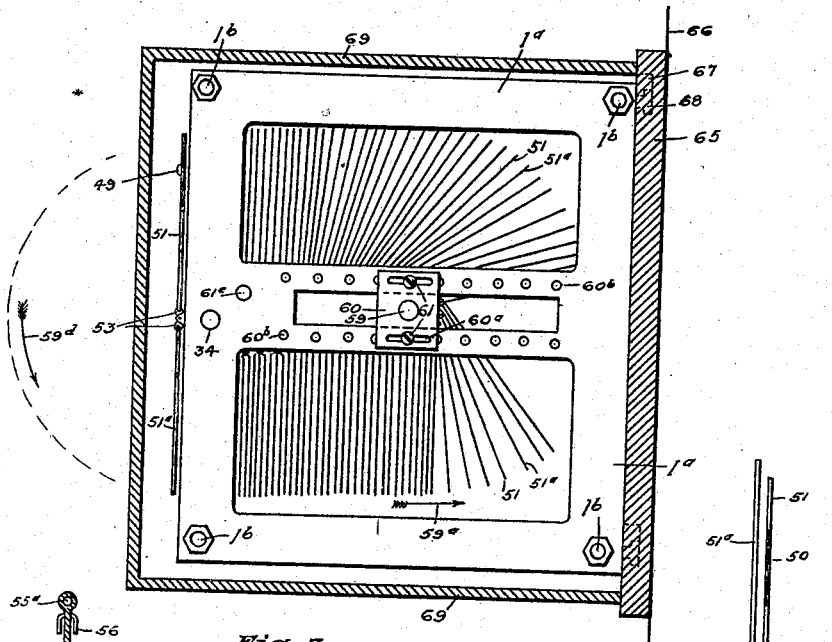
Fig. 3.
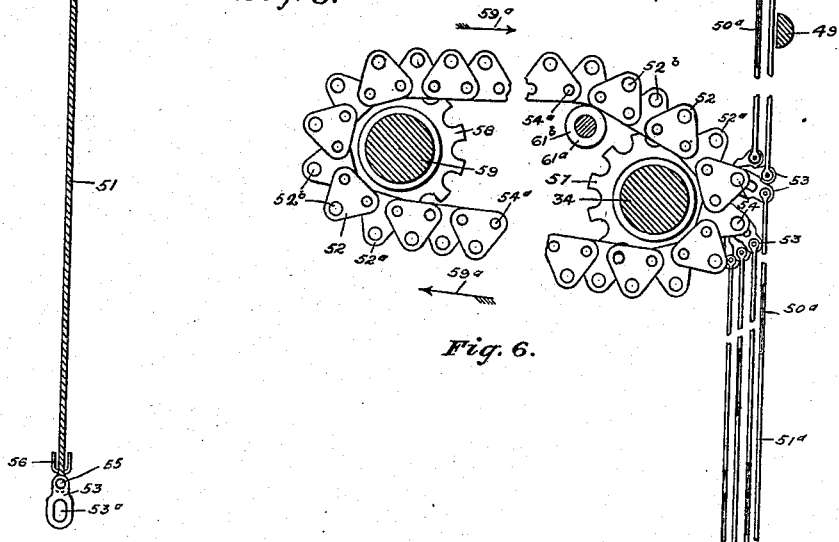
Fig. 6.
Fig. 4.
WITNESSES:
INVENTOR
ATTORNEY G. R. LIVERGOOD & B. C. DONNELLY.
STREET AND STATION ANNUNCIATOR AND ADVERTISER.
APPLICATION FILED MAY 26, 1908.
937,253.
Patented Oct. 19, 1909.
4 SHEETS—SHEET 3.
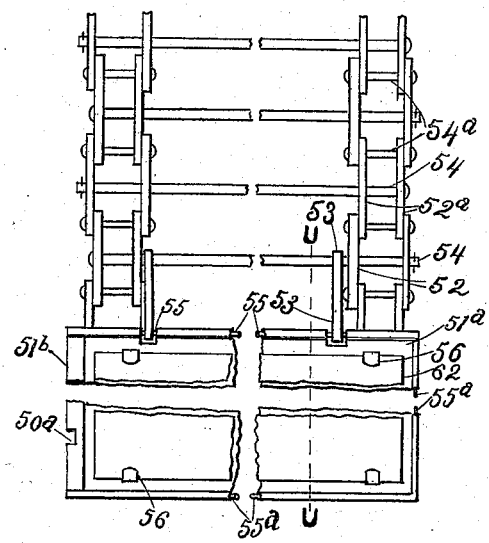
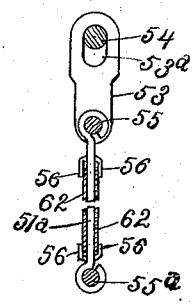
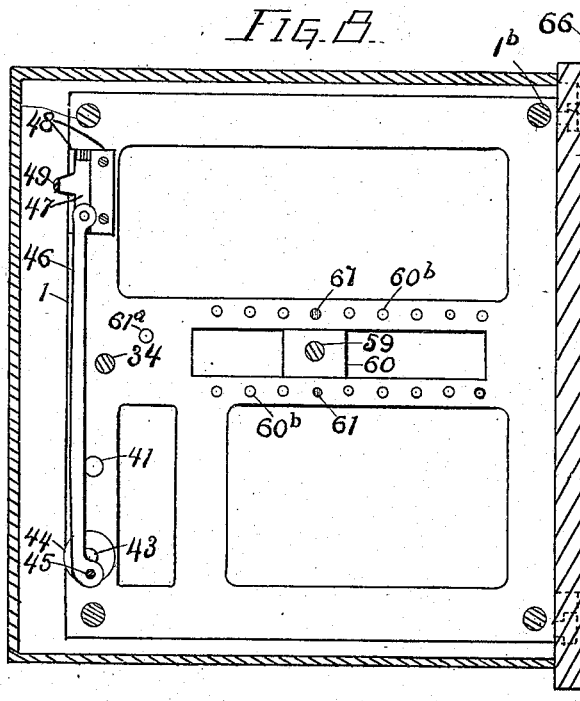
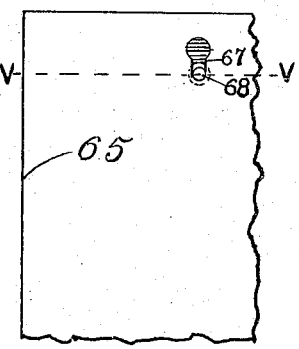
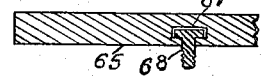
WITNESSES:
John J. Hinton.
Della Miller.
INVENTORS
Gerald R. Livergood
Bertram C. Donnelly
BY
George W. Hinton
ATTORNEY.

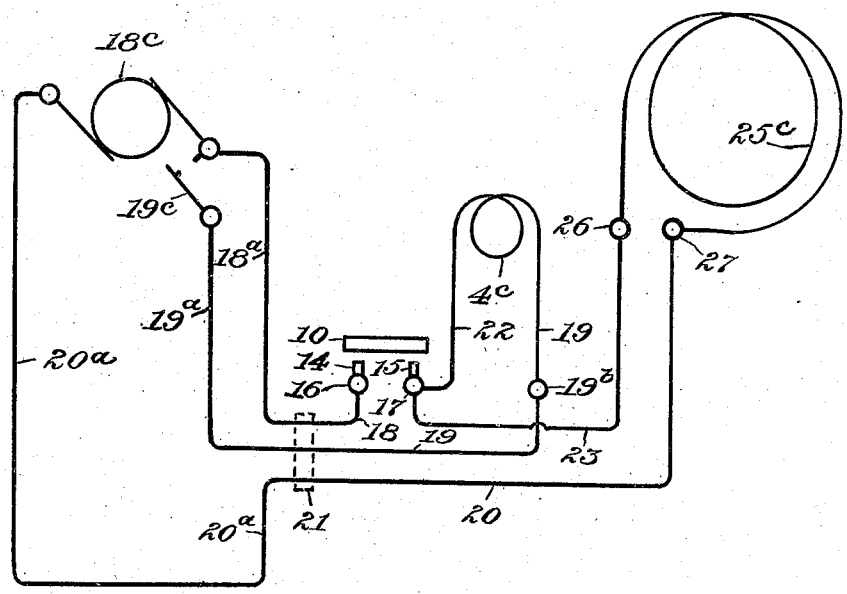

UNITED STATES PATENT OFFICE.

GERALD R. LIVERGOOD AND BERTRAM C. DONNELLY, OF ST. JOSEPH, MISSOURI, ASSIGNORS OF ONE-HALF TO E. P. SNOWDEN, OF ST. JOSEPH, MISSOURI.

STREET AND STATION ANNUNCIATOR AND ADVERTISER.

937,253.  Specification of Letters Patent.  Patented Oct. 19, 1909.

Application filed May 26, 1908. Serial No. 435,114.

To all whom it may concern:

Be it known that we, GERALD R. LIVERGOOD and BERTRAM C. DONNELLY, citizens of the United States, residing at St. Joseph, in the county of Buchanan and State of Missouri, have invented certain new and useful Improvements in Street and Station Annunciators and Advertisers, of which the following is a specification, reference being had therein to the accompanying drawing.

Our invention relates to improvements in street and station annunciators and advertisers for electric cars, and the objects of our improvements are, first: to provide an annunciator, that will automatically display interchangeable cards, on which are announced the names of streets or stations, and to automatically change a series of such displays in successive order, and to simultaneously display with each succeeding change, a separate advertisement; second; to so construct said annunciator that it will be positive in its action, when operated at any speed, whether said speed be extremely slow or extremely rapid, third; to so construct and arrange the parts of a street annunciator, that they shall be simple in construction, cheap in cost of manufacture, durable and not at all liable to get out of order from long and continued use, and by which the maximum number of said cards and advertisements are carried in the minimum amount of space. We attain these objects by the mechanism illustrated in the accompanying drawing, in which:—

Figure 1 is a transverse section, cut on the line X X, seen in Fig. 2. Fig. 2 is a front view, with the front of the inclosing case removed. Fig. 3 is a transverse section, cut on the line Z Z seen in Fig. 2. Fig. 4 is an enlarged transverse section of one of the card holders, cut on the line W W, seen in Fig. 2, the card being omitted to avoid confusion. Fig. 5 is an enlarged top plan of a part of the sprocket chain carrier with one of the card holders attached; certain parts being broken away, to avoid unnecessarily extending the drawing. Fig. 6 is an enlarged transverse section, cut on the line Y Y, certain parts being omitted to avoid confusing the details of the sprocket carrier. Fig. 7 is an enlarged transverse section in detail, of a card holder, cut on the line U U, seen in Fig. 5, certain parts being broken away, to avoid unnecessary extension of the drawing. Fig. 8 is a transverse section, on the line Y Y, seen in Fig. 2, looking to the left. Fig. 9 is a front view of a part of the back piece, showing one of its eye slots, with a stud bolt detachably secured therein; said stud bolt being detached from its frame piece, to avoid obscurity. Fig. 10 is a horizontal section on the line V V, seen in Fig. 9. Fig. 11 is a diagram of the windings, circuits and source of current.

Our invention consists of a frame for the machine, card holders for carrying detachably attached cards, a carrier for carrying said card holders, and releasing mechanism, for consecutively releasing said holders, adapted to be operated by an electrically operated driving mechanism, for driving said releasing mechanism and said carrier, provided with an electrically operated controller, for controlling said driving mechanism; all of which is hereinafter fully described.

Frame pieces 1 and 1$^a$, and stay bolts 1$^b$, for holding said frame pieces together, in their relation to each other, form the frame of the machine. To the frame piece 1 is secured the insulating block 2, on which is secured the relay frame 3, to which is attached the relay magnet 4; armature 5, normally actuated by spring 5$^a$, is pivotally attached to frame 3, by pivot 6, and is provided at its lower end with hook 7: circuit closer arm 8 is pivotally attached to frame 3, by pivot 9, and carries at its free end, the circuit closing block 10, pivotally attached by pivot 11 to bearing block 12, secured to the free end of arm 8, by any suitable insulating means, (not shown,) and separated from said arm by insulating block 13. The free end of arm 8 is provided with stud 8$^a$, and has its upward movement limited by stop 8$^b$, secured on insulating block 2: electrodes 14 and 15, secured respectively in binding-posts 16 and 17 are adapted to be electrically connected by block 10.

The previously described parts, together with the hereinafter described relay circuit, form the controlling mechanism.

Referring to Fig. 11, the following electric conductors, form the aforesaid relay circuit. Source of electric current 18ᶜ, any suitable circuit closing and opening device, 19ᶜ, wire 19ᵃ, three pole terminal plug 21, wire 19, post 19ᵇ, wire 19, relay winding 4ᶜ, wire 22, post 17, wire 23, post 26, solenoid winding 25ᶜ, post 27, wire 20, three way terminal plug 21, and ground wire 20ᵃ, back to source of current 18ᶜ. Electric conducting wires 18, 19 and 20 are respectively connected with wires 18ᵃ, 19ᵃ and 20ᵃ, by the three pole terminal plug 21. Wire 22 is one of the terminals of the windings 4ᶜ of magnet 4, of which wire 19 forms the other terminal, and is provided with binding-post 19ᵇ, for convenience in separating the parts.

Solenoid 25 is of the well known iron bound type, of which the casing 25ᵃ, is preferably cast with frame piece 1, for rendering its securement to said frame piece most substantial, and to cheapen the cost of manufacture of said parts; the windings 25ᶜ of said solenoid terminate at the binding-posts 26 and 27. Post 26 is connected with post 17, by wire 23, and post 27 is connected with the ground wire 20ᵃ, by wire 20. In the upper part of solenoid 25 is seen the pole-piece 28ᵃ; solenoid core 28, carries arm 29, in the outer end of which is the adjustable circuit opening screw 30; said core 28 also carries the pivotally attached pawl 31, actuated by spring 32 to engage the ratchets of ratchet wheel 33, for rotating shaft 34, on which said ratchet wheel is secured; retaining pawl 35, pivotally attached to solenoid casing 25ᵃ, is actuated by spring 36, to engage the ratchets on said ratchet wheel, for retaining each succeeding step of the rotation of said wheel. Solenoid core 28 is guided by its guide stem 28ᵇ formed therewith, which passes through an aperture in guide bracket 37, formed with frame piece 1. Shaft 34 is rotatably supported by frame piece 1 near its left end and its right end is journaled in frame piece 1ᵃ; said shaft carries and drives gear wheel 38, which engages gear pinion 39 formed with gear wheel 40, which rotates on stud 41, secured to frame piece 1; gear wheel 40 drives pinion 42, secured on shaft 43, which rotates in frame 1, and carries on its inner end the crank disk 44, (see Fig. 2), which is provided with crank 45, which by the connecting rod 46, drives escapement block 47, in guides 48; said escapement block carries escapement pin 49, upward into register with notch 50, cut in the edges of card holder 51, for releasing the free edge of said card holder, the opposite edge of which is pivotally and slidably attached to one of the carrying rods 54, of the sprocket chain carrier, by slotted links 53, (see Fig. 6), and said escapement pin, by the described mechanism is carried downward, at the next step of the rotation of ratchet wheel 33, into register with notch 50ᵃ, for releasing its succeeding card holder, 51ᵃ.

It will be understood that the previously described train of gears is properly proportioned and timed to cause one upward movement of escapement pin 49, at one step of ratchet wheel 33 and to cause one downward movement of said pin at the next step, and to continue, in like manner at each succeeding step of the rotation of said ratchet wheel.

The sprocket carrier, to which previous reference has been made, is composed of the series of triangular shaped outer links 52, and the series of inner links 52ᵃ, (of the same form,) secured together in the usual manner, by riveted pins 54ᵃ, (see Figs. 5 and 6). The outer corners of said links are provided with perforations 52ᵇ, for the reception of carrying rods 54, which are previously passed through slots 53ᵃ, for carrying links 53 (more clearly shown in Fig. 4). Wire 55 is passed through an aperture in the free end of slotted link 53, and is afterward crimped in the turned edge of card holder 51, for securing said holder to said link, and for stiffening the thus pivotally secured edge of said holder. Wire 55ᵃ, is for stiffening the free edge of said card holder, the right end of which is stiffened in the same manner by a wire not shown; the left end of said card holder, (see Fig. 2,) is stiffened by metal strip 51ᵇ, which is also for reinforcing the edges of notch 50. In Figs. 2 and 4 (on card holder 51,) are seen the flange points 56, which are preferably formed by stamping them from the sheet metal, of which holder 51 is constructed, and which provide means whereby cards 62 and 62ᵃ are detachably attached to said holder. It will be seen by referring to Fig. 6, that card holders 51ᵃ, are exactly like the described holder 51 in all particulars, except that holders 51ᵃ, have their releasing notches 50ᵃ, cut in their edges, at points nearer their pivotally secured edges, than are the notches 50, in holders 51: it will also be seen that the holders 51 and 51ᵃ, are alternated throughout the entire series of holders, which is done, in order to bring their respective notches in proper position to consecutively register with the reciprocatively moved and previously described escapement pin 49, whereby said card holder 51 is released and the next succeeding holder, of the series of holders is held, until the return movement of pin 49, which in like manner, releases said succeeding holder 51ᵃ, and so on continuously, while in operation: it will be seen in Fig. 6, that three of said holders are secured by links 53, on each one of the rods 53ᵃ, which together with the alternated sprocket links, 52 and 52ᵃ, provide means whereby the maximum number of said holders are carried in the minimum amount of space, by parts of ample proportions to be thoroughly substantial, and be capable of withstanding wear, arising from long and continued use. While we have shown three of said card holders attached to each of said carrying rods, it is evident that any desired number of said holders may be attached to each of said rods, in order to compact said series of card holders. The slots 53ª, in links 53, provide means by which holders 51 and 51ª, automatically adjust themselves to the contracted lateral space into which said holders are crowded, by the change of position of sprocket links 52 and 52ª, made in rounding sprocket wheel 57, secured on shaft 34.

Referring to Fig. 6, the before described sprocket chain is driven by sprocket wheel 57 in the direction indicated by arrow 59ª, and passes around sprocket wheel 58, secured on shaft 59, which rotates in two boxes, one of which is seen at 60, in Fig. 3. Said chain is lengthened or shortened, as desired by adding or subtracting the desired number of links, and is tensioned by the adjustment of said boxes on frame 1ª, by screws 61, passed through slots 60ª, in said boxes, and screwed into threaded apertures 60ᵇ in said frame pieces 1. Said sprocket chain is caused to descend an incline by passing over two idle pulleys, one of which is seen at 61ᵇ, which rotate with shaft 61ª, the journaled ends of which rotate in frame pieces 1 and 1ª. The object of said inclining of said chain, is to produce a contracted lateral spacing of the card holders 51 and 51ª, which together with the gravity of said holders, cause said holders to assume the vertical position, and to press their free edges consecutively against escapement pin 49.

It will be seen by referring to Fig. 2, that the cards 62 and 62ª, (detachably attached to card holders, as described,) are adapted to display the name of a street 63, on the upper part of card 62 and to display an advertisement 64 on the lower part of card 62 and the entire card 62ª. Card 62 is on the front of holder 51 and card 62ª, is on the back of holder 51ª, the front side of which had been previously exposed. All of said card holders are thus equipped with said cards; thus providing means for utilizing both sides of all of said card holders.

Referring to Figs. 3, 8, 9 and 10 back piece 65 is secured to surface 66, (which may be the wall of an electric car, or any other desired object), in any substantial manner, and is provided with eye slots 67, which receive the flanged ends of stud bolts 68, (secured to frame pieces 1 and 1ª) which are adapted to gravitate to secure position in said slots, thus providing ready means for detachably attaching the frame of the machine to back piece 65. Case 69 is detachably attached to back piece 65, by any suitable attachment, not shown.

In the operation of our invention, electric current is supplied from source 18ᶜ, which is connected and disconnected from wire 19ª, by any suitable circuit closing and opening device 19ᶜ. When said device is closed, it will be seen in Fig. 11, that said source of electric current, is connected with the previously described relay circuit, which fully excites relay magnet 4, and by reason of the resistance of relay magnet winding 4ᶜ, in said circuit, the excitement of solenoid 25, (see Fig. 1,) is so reduced, as to render said solenoid inoperative at this juncture. Magnet 4, upon being thus excited, draws hook 7, by its armature 5, from engagement with stud 8ª, after which the free end of circuit closer arm 8, gravitates and carries the pivotally attached circuit closing block, 10, in contact with terminals 14 and 15, thereby closing the solenoid circuit, which comprises source of current 18ᶜ, wire 18ª, three way terminal plug 21, wire 18, post 16, terminal 14, block 10, terminal 15, post 17, wire 23, post 26, solenoid winding 25ᶜ, post 27, wire 20, plug 21, and wire 20ª, back to source of current 18ᶜ, which fully excites solenoid 25, thereby raising solenoid core 28, which is stopped in its upward movement, by pole-piece 28ª. Core 28, at the upper end of its stroke, (by arm 29), carries circuit opening screw 30, against and lifts closer arm 8, to the position seen in Fig. 1; and thereby carries stud 8ª, above hook 7. Arm 8 at the same time, lifts block 10 from terminals 14 and 15, thus opening the heretofore described solenoid circuit. After said solenoid circuit is thus opened, said electric current passes through the heretofore described relay circuit, which it will be remembered includes, in series, the windings, of said relay and said solenoid, thus partially energizing said solenoid. This partial energizing of said solenoid is sufficient to cause solenoid core 28 to be retained at the upper end of its movement. When the source of electric current 18ᶜ is disconnected from said relay circuit, by the circuit closing and opening device 19ᶜ said solenoid thereby becomes deënergized, and core 28 gravitates to normal position and rests on bracket 37. At the same time, said disconnection deënergizes relay magnet 4 which ceases to draw armature 5, upon which spring 5ª moves said armature to normal position, and also moves hook 7 into engagement with stud 8ª, thereby retaining arm 8 in normal position, as seen, thus completing one operation of the driving mechanism, which operation causes the release of one of the card holders 51, and the recovery of another one of said holders, in the following manner. When core 28 is raised, as previously described, said core raises pawl 31, which drives ratchet wheel 33 one advancing step, which rotates shaft 34 and the described sprocket chain carrier carrying card holders 51 and 51ª, (see Fig. 6,) the exact lateral space of one card holder; at the same time, escapement pin 49, is carried by the previously described mechanism, into register with notch 50, thereby releasing holder 51, which rotates by gravity, (in the direction indicated by arrow 59ᵈ, on links 53, to the pendent, vertical position, seen in Fig. 3; at the same time the entire series of card holders 51 and 51ª, are advanced one step, in the direction indicated by arrow 59ª; and said operation is repeated, each and every time that said relay circuit is closed and opened, by the before mentioned relay circuit closer, not shown.

Having fully described our invention, what we claim as new and original, and desire to secure by Letters Patent is:—

1. In a machine of the character described, the combination with a series of card holders, adapted to carry detachably attached cards, of the herein described sprocket chain carrier, adapted to carry said holders, by pivotal attachment, attached to one edge of each of said holders, together with inclining means, for inclining said carrier; alternating escapement means, for the successive escapement of the free edges of said card holders; driving means, for synchronously driving said carrier and said escapement means; together with a relay controller for controlling said driving means, and a frame for supporting the parts of the machine.

2. In a machine of the character described, the combination with a series of card holders, adapted to carry cards, detachably attached thereon, of a sprocket chain carrier, carrying said card holders by pivotal attachments, attached to one edge of each of said holders; alternating escapement means, for the successive escapement of the free edges of said card holders; driving means, for synchronously driving said carrier and said escapement means; a solenoid for actuating said driving means; an electric relay controller, for controlling the action of said solenoid; electric conductors for said solenoid and relay controller, and a frame for said machine.

3. In a machine of the character described, the combination with a sprocket chain carrier, provided with a series of carrying rods carried transversely by said carrier, of a series of card holders having their inner edges pivotally secured to said carrying rods by slotted links, and their free edges provided with alternate escapement notches, as shown; an escapement pin, adapted to normally support said free edges, and reciprocating means, whereby said escapement pin is reciprocatively moved into register with said alternate notches, in succession for the successive release of the free edges of said card holders.

4. In a machine of the character described, the combination with a series of card holders, provided with alternated notches in the edges thereof, together with carrying means, for carrying said card holders; of a solenoid, provided with a core therein, adapted to be moved upward by electric energy, and downward by gravity; a pawl, carried by said core; a ratchet wheel, driven by said pawl; a shaft, provided with a crank disk on one end thereof; a train of gears, intermediate said ratchet wheel and said shaft; a guided escapement block, provided with an escapement pin, projecting therefrom; and rod and crank connections between said crank disk and said escapement block; the whole arranged to reciprocatively move said escapement pin, successively in register with said alternate notches, in said card holders.

5. In a machine of the character described, a card holder, comprising a sheet of metal, provided with a reinforcing wire, crimped in two sides and one end, at the edges thereof, and having a plurality of slotted links pivotally secured on one of said wires; a reinforcing plate secured on the other end of said holder, provided with an escapement notch, through said plate and holder; flange points formed on both front and back of said holder, and adapted to detachably hold the edges of cards between said points and holder.

6. In a machine of the character described, a back piece and a frame for said machine, comprising two end pieces and a plurality of stay-bolts for holding said pieces in their relation to each other; and a solenoid casing and a guide bracket, formed with one of said end pieces, together with attaching means for detachably attaching said frame to said back piece, and a casing for inclosing said machine.

7. In a machine of the character described, the combination with the frame of said machine, of a sprocket chain carrier, comprising two sets of triangular shaped links, riveted together, to form two endless sprocket chains; one series of carrying rods, the ends of which are secured in the outer corners of said links, as shown, each of said rods being adapted to carry a plurality of card holders, pivotally attached thereto; two rear sprocket wheels, adapted to carry the respective rear portions of said sprocket chains, and secured on a shaft having journaled ends provided with boxes, in which said journaled ends rotate; adjustable securing means whereby said boxes are secured on said frame, two front sprocket wheels, adapted to support the front end portions of said two sprocket chains, a front shaft journaled in the said frame, and two idle pulleys, and a shaft therefor, for inclining said sprocket chains.

8. In a machine of the character described, the combination with the herein described series of sheet metal card holders, of a plurality of slotted links, pivotally secured to one edge of each of said holders; the herein described sprocket chain carrier, provided with carrying rods as shown, which are passed through the slots of said slotted links, for pivotally and slidably securing said card holders on said carrying rods.

In testimony whereof we affix our signatures in the presence of two witnesses.

GERALD R. LIVERGOOD.
BERTRAM C. DONNELLY.

Witnesses:
MAE EVANS,
GEORGE W. EASTIN.